US008638941B2

(12) United States Patent
Schneider

(10) Patent No.: US 8,638,941 B2
(45) Date of Patent: Jan. 28, 2014

(54) DISTRIBUTING KEYPAIRS BETWEEN NETWORK APPLIANCES, SERVERS, AND OTHER NETWORK ASSETS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1030 days.

(21) Appl. No.: 12/121,663

(22) Filed: May 15, 2008

(65) Prior Publication Data

US 2009/0285399 A1 Nov. 19, 2009

(51) Int. Cl.
*H04L 9/08* (2006.01)
(52) U.S. Cl.
USPC ............................................. 380/278
(58) Field of Classification Search
USPC ............................................. 380/278
See application file for complete search history.

(56) References Cited

U.S. PATENT DOCUMENTS

| | | | | |
|---|---|---|---|---|
| 6,108,644 | A * | 8/2000 | Goldschlag et al. | 705/69 |
| 6,865,673 | B1 * | 3/2005 | Nessett et al. | 713/155 |
| 7,188,160 | B2 * | 3/2007 | Champagne et al. | 709/220 |
| 2002/0026582 | A1 * | 2/2002 | Futamura et al. | 713/170 |
| 2003/0033521 | A1 * | 2/2003 | Sahlbach | 713/156 |
| 2004/0030887 | A1 * | 2/2004 | Harrisville-Wolff et al. | 713/155 |
| 2004/0111391 | A1 * | 6/2004 | Fujita et al. | 707/1 |
| 2005/0097332 | A1 * | 5/2005 | Imai | 713/176 |
| 2005/0147249 | A1 * | 7/2005 | Gustavsson et al. | 380/247 |
| 2006/0074465 | A1 * | 4/2006 | Webb | 607/60 |
| 2006/0080527 | A1 * | 4/2006 | Novack et al. | 713/156 |
| 2007/0061434 | A1 * | 3/2007 | Schmieder et al. | 709/223 |
| 2007/0061878 | A1 * | 3/2007 | Hagiu et al. | 726/14 |

FOREIGN PATENT DOCUMENTS

WO   WO 0101644 A1 *  1/2001

OTHER PUBLICATIONS

NPL "Internet X.509 Public Key Infrastructure Certificate Management Protocols" (Mar. 1999) by C. Adams et al.; 68 pages; converted to PDF originally from http://www.ietf.org/rfc/rfc2510.txt.*

* cited by examiner

*Primary Examiner* — Taghi Arani
*Assistant Examiner* — Dao Ho
(74) *Attorney, Agent, or Firm* — Lowenstein Sandler LLP

(57) ABSTRACT

A method and apparatus for providing an automated key distribution process to enable communication between two networked devices without the need for human provision of a key to both networked devices. In response to a first connection request from a first network device to a second network device, the second network device will check for a credential such as a public key for the first network device. If the credential is not present, then the second network device will communicate with the first network device on a second secured and pre-defined connection to obtain a certificate from the first network device. The second network device then queries a backend server with the certificate to obtain a credential such as the public key for the first network device. Subsequent connection or communication requests from the first network device will then be properly serviced.

7 Claims, 6 Drawing Sheets

DISTRIBUTING KEYPAIRS BETWEEN NETWORK APPLIANCES, SERVERS, AND OTHER NETWORK ASSETS

TECHNICAL FIELD

Embodiments of the present invention relate to the distribution of keypairs between networked devices. Specifically, the embodiments of the present invention relate to automating the distribution of keypairs for establishing secured communication between networked devices.

BACKGROUND

Network administrators often need to set up secured communication between devices on a network. This requires the network administrator to manually input a pair of shared keys on each network device or application that requires secure communication. In some cases, multiple keys must be manually input on each machine for different applications or different secured communication protocols. In large networks or clusters of computers this can be a time consuming task.

In addition, the manual input process is prone to error. Human entry of the data into each computer can result in mis-typed or mis-read keys being provided to a machine. This risk is greatly amplified in large systems. This increases the time and resources needed to set up the secured communication and to debug errors in the secured communication.

Shared keys are needed in the context of monitoring and managing computer systems and components over a network. A monitoring appliance communicates with agents that directly monitor or control devices or components in the system. The agents provide access to monitored device data as a set of variables. Device data that can be monitored by an agent can include an amount of free memory in a system and a number of running processes on that system. The monitoring appliance can access the monitored device data through requests over a secured communication channel.

The monitoring appliance gathers data from a plurality of agents and then makes the data available to users and administrators through a service provided as web based data management interface. The data management interface is provided by a backend server system. The backend server system obtains data from the agents via the monitoring appliance. The monitoring appliance is a machine on a local network that communicates with each agent and collects relevant information to be passed to the backend server. A separate monitoring appliance is utilized for each local network or for each account handled by the backend server.

During configuration of new agents, each agent must be configured to recognize the monitoring appliance. Part of this process is providing a public key to each agent to enable secure communications with the monitoring appliance. This involves a manual input process or cut and paste operation to provide the monitoring appliance key to the agent. As with other manual key distributions processes, this process is prone to human error in copying the monitoring appliance key into the agents manually.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one

DETAILED DESCRIPTION

Described herein is a method and apparatus for providing an automated key distribution process to enable communication between two networked devices without the need for human provision of a key to both networked devices. In response to a first connection request from a first network device to a second network device, the second network device will check for a credential such as a public key for the first network device. If the credential is not present, then the second network device will communicate with the first network device on a second secured and pre-defined connection to obtain a certificate from the first network device. The second network device then queries a backend server with the certificate to obtain a credential such as the public key for the first network device. Subsequent connection or communication requests from the first network device will then be properly serviced using the public key to establish secure communication between the second network device and the first network device.

The invention is described herein using an example embodiment of a monitoring appliance that collects data from a set of agents. This embodiment is utilized for sake of clarity in describing the structures and methods of the invention and is not intended to limit the scope of the invention to this particular implementation. One skilled in the art would understand that the principles and features of the invention described in relation to this example embodiment applicable to any scenario where keys or similar data are to be distributed amongst a group of networked devices that need to share keys for secured communications without requiring manual input of these keys with each machine and each application.

Figure 1:
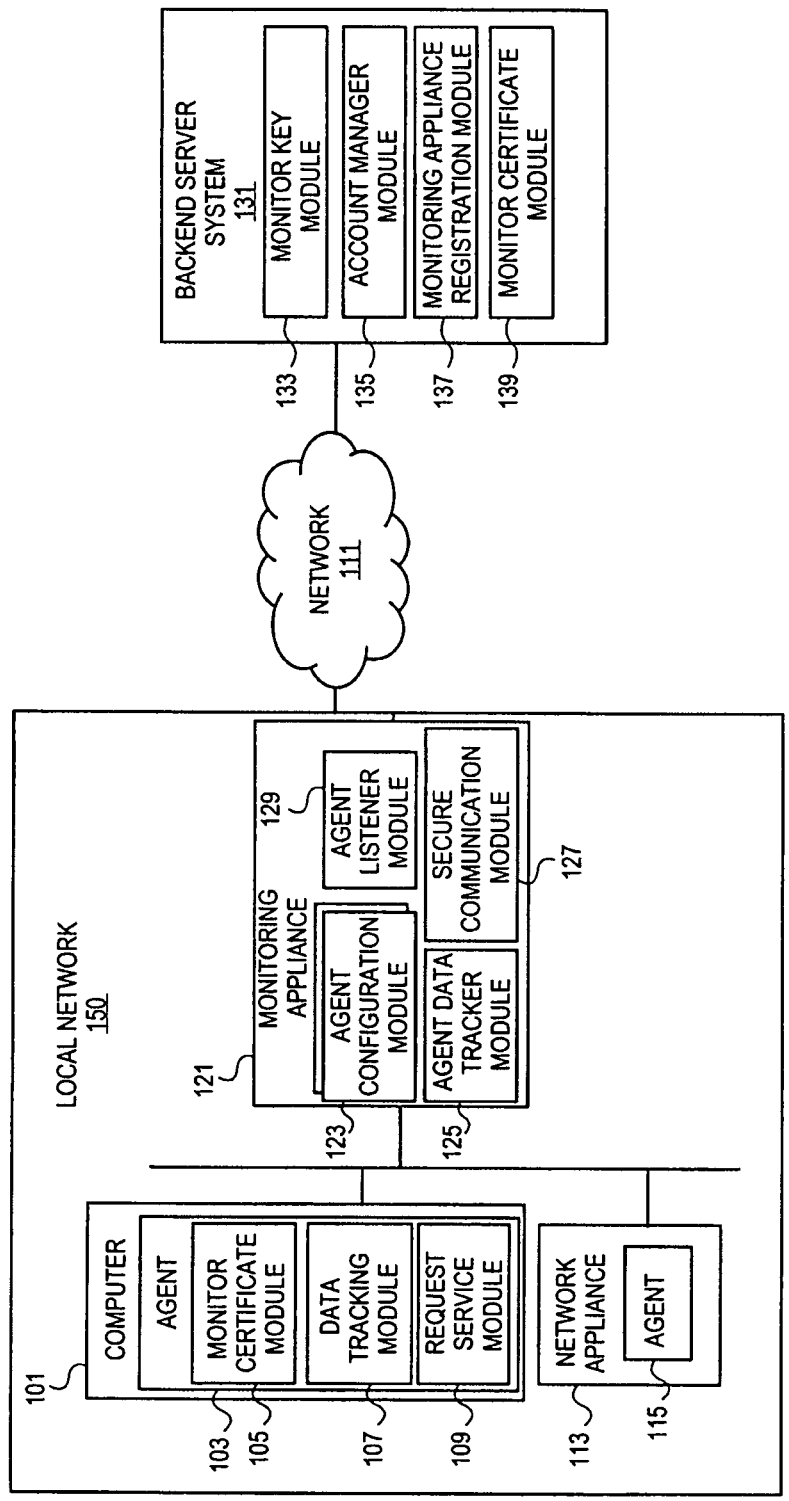
FIG. 1 is a diagram of one embodiment of a system for automated agent-monitoring appliance configuration.

FIG. 1 is a diagram of one embodiment of a system for automated key distribution in the example context of an agent and monitoring appliance configuration, which is part of a monitoring system. The owner or administrator of computers 101, network appliances 113 and similar networked devices on a local network 150 or set of local networks uses a monitoring appliance 121 and a set of agents 103, 115 to monitor conditions in the local network 150 as well as the devices connected to that network 150. The owner or administrator of the local network 150 can contract with a web-based management provider for use of an account on a backend server that provides access to the monitored data of the local network 150 through a web based interface. This enables the administrators of the local network 150 to view and manage the data from any computer connected to the web by using the backend server system 131. The monitoring of data is established through automated configuration including automated key distribution between the agents 103, 115 and monitoring appliance 121 of the local network 150.

The local network 150 can be any type of network including a local area network (LAN), wide area network (WAN), such as the Internet or similar network. Any number of computers 101, network appliances 113 or monitoring appliance 121 can be connected to the local network 150. Each device that is to be monitored includes an agent 103, 115. These monitored devices are each connected to the local network 150 and in communication with monitoring appliance 121. The computers 101 can be desktop computers, laptop computers, handheld computers, console devices, servers or similar computing devices. Network appliances 113 can be routers, bridges, repeaters, printers, scanners or similar network devices.

The agents 103, 115 on each monitored device can include a monitor certificate module 105, a data tracking module 107 and a request service module 109. In one example embodiment, the agents 103, 115 are secure shell (SSH) server daemons. The monitor certificate module 105 can store monitoring appliance certificate information for the respective agent 103, 115. The monitor certificate module can also handle the validation of a connection request from a monitoring appliance 121. The process of the monitoring appliance certificate module is described in further detail in regard to FIG. 3 below.

The data tracking module 107 monitors and tracks data regarding the computer 101 or similar resources in communication with the computer 101 as configured by the administrator either directly through the agent 103 or the backend server system 131. The data tracking module 107 can be configured to monitor any number of different resources accessible to the computer 101. Example resources that can be monitored include available memory resources, networking throughput, executing processes and similar resources and operating statistics. The data tracking module 107 can store and update the tracked data to be provided to the monitoring appliance 121 in response to a query for the data.

The request service module 109 services data requests from the monitoring appliance 121. Request service module 109 works in conjunction with the data tracking module 107 by querying the data tracking module 109 to obtain the requested data when servicing request from the monitoring appliance 121. The requests from the monitoring appliance 121 can be made using SSH. The request service module 109 can also work in conjunction with the monitor certificate module 105 to verify and establish connections with the monitoring appliance 121.

The processes and structure of the modules of the agent 103 are provided by way of example. One skilled in the art would understand that the functions and structures of these modules could also be combined into a single module or divided into any number of discrete modules. Other modules and components of the agents have been omitted for sake of clarity.

The monitoring appliance 121 can include an agent configuration module 123, an agent listener module 129, an agent data tracker module 125 and a secure communication module 127. The agent configuration module 123 stores configuration information about each of the agents 103, 115 that are monitored by the monitoring appliance 121. Stored information can include data regarding the type and identity of information that is to be queried from each agent 103, 115, as well as, addressing and similar communication data related to each agent 103, 115.

The agent data tracker module 125 stores data retrieved from each of the agents 103, 115. This data is then provided to the backend server system 131 to be made available to users of the associated account on the backend server system 131. Any amount of data can be stored by the agent data tracker module 125. In one embodiment, tracked data is persistently stored by the agent data tracker module 125. In another embodiment, the data is stored by the agent data tracker module 125 is discarded after it is uploaded to the backend server system 131.

The agent listener module 129 is initiated in response to a failed connection request with an agent 103, 115. The agent listener module 129 monitors a predefined set of ports for a data request or connection request from an agent 103, 115. In response to the request, the agent listener module 129 supplies a certificate for the monitoring appliance 121 through the known port. The agent listener module 129 is then closed after servicing the request or after a brief period of time. The brief period of time is set as part of a timeout process. The vulnerability of the monitoring appliance 121 is limited by setting up the agent listener module 129 only for a short time after a connection request has failed. This minimizes the possibilities for a malicious program to gain information from the monitoring appliance 121 by minimizing the time frame during which the agent listener module 129 is monitoring and responding to requests on a known port. The agent listener module 129 can utilize the HTTPS protocol or similar protocol to communicate with the agent. In one embodiment, the agent listener module 129 restricts requests to be serviced to only those agents that have recently failed a connection request.

The secure communication module 127 forms connections with each of the agents 103, 115 to obtain data required by the agent data tracker module 125. The secure communication module 127 can use SSH or similar secure communication protocols to establish communication channels between the agents 103, 115 and the monitoring appliance 121. These secure connections are then utilized to send requests from the monitoring appliance 121 to the agents 103, 115. The secured connections are then used by the agents 103,115 to reply to the requests with the appropriate responses and data.

The division of function and structure among the modules of the monitoring appliance 121 is provided by way of example. One of ordinary skill in the art would understand that the functionality and structures described could be combined into a single module or divided amongst any number of modules. Other modules of the monitoring appliance 121 have been omitted for sake of clarity.

The network 111 connecting the local network 150 and the backend server system 131 can be any type of network including a LAN, a WAN, such as the Internet or a similar network. The network 111 can be a wired or wireless network or any combination thereof. In one embodiment, a permanent connection such as a virtual private network (VPN) can be established over the network 111 between the local network 150 and the backend server system 131. In another embodiment, the backend server system 131 and account information is available through a temporary connection such as an HTTP or HTTPS connection.

The backend server system 131 can be hosted by service provider such as through a software-as-service business module or similar system. The backend server system 131 can include a monitor key module 133, an account manager module 135, a monitoring appliance registration module 137 and a monitor certificate module 139 amongst other modules and components.

A monitor key module 133 tracks public keys, such as SSH public keys, for each of the monitoring appliances 121 registered with the backend server system 131. These monitoring appliance keys can be provided to agents as part of an automatic configuration process. The monitoring appliance keys are obtained through monitoring appliance registration process or are input by an administrator or user of the associated account.

The account manager module 135 tracks the correspondence between each agent 103, 115 and monitoring appliance 121 and a particular account that is serviced by the backend server system 131. The account manager module 135 restricts the availability of information such as monitoring appliance keys and monitoring appliance certificate information to devices tied to a related account. In another embodiment, account information is further limited to specific users that must be authenticated before gaining access to the account information.

The monitoring appliance registration module 137 services an automated monitoring appliance registration process whereby a monitoring appliance provides a public key and certificate to the backend server system 131. The monitoring appliance registration module 137 then stores the monitoring appliance key through the monitor key module 133 and the monitoring appliance certificate through the monitor certificate module 139. The registration process is discussed in greater detail below in regard to FIG. 6.

The monitor certificate module 139 services requests for monitoring appliance certificate information. The monitor certificate module 139 coordinates with the monitor key module 133 to service requests from the agents 103, 115 for the monitoring appliance key (a public key for the monitoring appliance) or similar key information. The appropriate key is determined by looking up the key associated with a monitoring appliance certificate received from the agent 103, 115. The process of the monitor certificate module 139 is described in greater detail in relation to FIG. 4.

The division of function and structure among the modules of the backend server system 131 is provided by way of example. One of ordinary skill in the art would understand that the functionality and structures described could be combined into a single module or divided amongst any number of modules. Other modules of the backend server system 131 have been omitted for sake of clarity.

Figure 2:
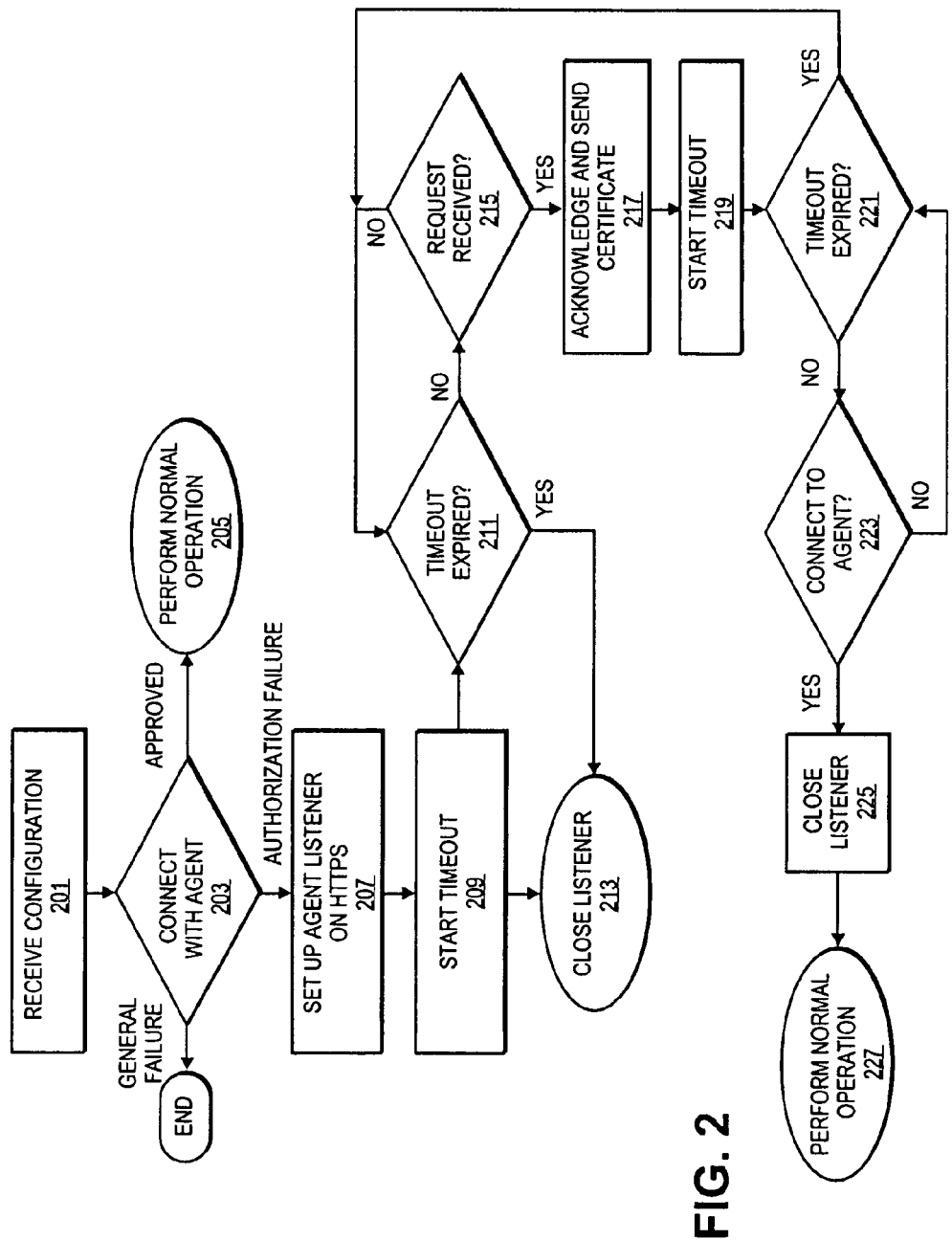
FIG. 2 is a flowchart of one embodiment of process for monitoring appliance configuration.

FIG. 2 is a flowchart of one embodiment of a process for the monitoring appliance to perform the automated configuration process. This process can be performed by any network device attempting to connect with another network device using a secured connection (i.e., a first network device connecting to a second network device). The monitoring appliance connecting to an agent is provided as an example embodiment.

The process can be initiated upon receipt by the monitoring appliance of configuration data for an agent that has been added on the local network (Block 201). A user or administrator can input a configuration for a new agent that is in communication with the monitoring appliance over the local area network.

The configuration information can specify the data to be queried from the agent as well as identification information and similar information for the agent. The monitoring appliance can then use the configuration information to periodically query the agent to obtain the data required by the configuration. The data obtained from the agent is then supplied to the backend server system.

At a designated time or interval, the monitoring appliance attempts to connect with each configured agent to obtain the data specified by the associated configuration (Block 203). If the connection is accepted by the agent, then a secure communication channel is established between the agent and monitoring appliance. The monitoring appliance can send requests to the agent over the secured channel according to the normal operation of the monitoring appliance and agent (Block 205). If the connection is not accepted because there is no agent to receive it or some other general failure occurs, then the connection is not established and the process ends. However, if the connection is refused by the agent due to an authorization failure due to the agent not having the key utilized by the monitoring appliance, then the connection request fails and no secured channel is established between the agent and the monitoring appliance.

In response to a failed authorization during the connection request, the monitoring appliance initiates an agent listener on a known port (Block 207). The agent listener may utilize HTTPS to monitor the known port or a similar communication protocol can be utilized. On establishment of the agent listener, a timeout counter is initiated (Block 209). A time for connection with the agent listener over the known port by the agent listener is limited to a fixed time period to minimize the chances of a malicious attack using the open port.

A check is intermittently made to determine whether the timeout period has expired (Block 211). The timeout period can have any length and can be checked at any frequency. In one embodiment, the timeout tracking process as well as the management of the listener is executed and managed by the same process that manages the connection with the agent. In another embodiment, the timeout tracking process and agent management process are executed by a separate process or set of processes.

If a timeout period has expired, then the listener is closed (Block 213). If a timeout period has not expired, then a check is made to determine whether a request has been received (Block 215). If no requests have been received, then a check for the timeout period expiration is again made (Block 211). If a request has been received, then the requested certificate is sent to the requesting agent along with an acknowledgment message (Block 217). In one embodiment, the agent requests a certificate identifying the monitoring appliance, which it will utilize to obtain the public key or similar credential from the backend server system to enable it to accept future requests from the monitoring appliance. In another embodiment, the agent receives certificate information from the monitoring appliance through the process of establishing a connection to the monitoring appliance. For example, the agent may request an SSL connection with the monitoring appliance on a known port. The agent then receives the SSL certificate of the monitoring appliance as part of the setup protocol for the SSL connection.

After the acknowledgment is sent with the requested certificate, a new timeout counter is started (Block.219). This timeout period can have any duration and be checked at any frequency. This timeout period is provided to allow an agent to connect to the monitoring appliance after it obtains the appropriate public key or credential from the backend server. In one embodiment, this time period may be limited by the overall timeout period for the listener.

A check is periodically made to determine if the agent connection timeout period has expired (Block 221). A check is also made to determine if a successful agent connection is made (Block 223). If an agent connection is not made during this time period, then the process returns to the listener timeout check (Block 211). If a connection is successfully established, then the listener is closed (Block 225). The monitoring appliance can send requests to the agent over the secured channel according to the normal operation of the monitoring appliance and agent (Block 227). The shorter the specified time periods for both the listener and the agent connection, the more secure the monitoring appliance is against malicious attacks on the open port. In addition, any of the operations of this process can be performed by separate processes or sets of processes. For example, the handling of received requests in Blocks 217-227 may be handled by separate processes or threads of execution. Each request can be handled by a separate child process. This enables the overall process to withstand hostile attacks on the system such as a malicious program that sends a stream of invalid connection requests.

In another embodiment, in response to an authorization failure when the monitoring appliance attempts to connect to the agent, a listener management process is generated while the main process proceeds to other monitoring tasks. The listener management process determines whether a listener process is running. If the listener process is running, then the listener management process resets its timeout process to ensure that the agent associated with the recent authorization failure has time to connect to the listener. If the listener process is not running, then the listener management process initiates the listener process with a full timeout period. The listener process responds to incoming requests by spawning a child process or thread for each connection request. The listener process terminates when the timeout expires.

In a further embodiment, an event management process that monitors processes for particular events and terminates those processes if the event does not occur during a defined time frame. In this embodiment, a process generated in response to a failed authorization would interact with the event management process to determine if a listener process was running and initiate the listener if not running. The process generated in response to the failed authorization then triggers an event monitored by the event management process to extend a time frame for the listener to monitor for the connection request. An example event is the alteration of a timestamp on a file. The process generated in response to the authorization failure modifies the timestamp and exits, which triggers the event manager and extends the life of the listener.

Figure 3:
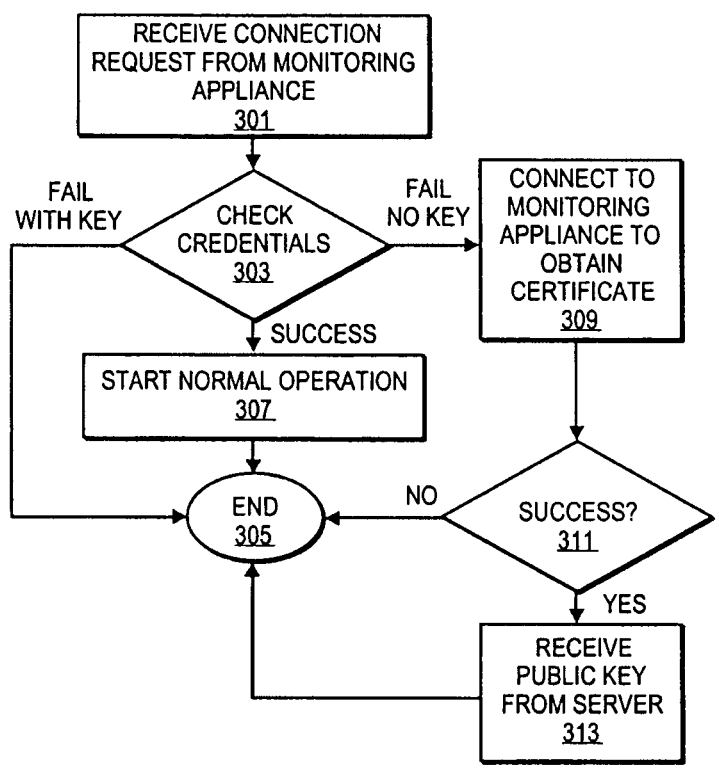
FIG. 3 is a flowchart of one embodiment of a process for agent configuration.

FIG. 3 is a flowchart of one embodiment of a process for automated configuration performed by the agent. This process can be performed by any network device that is handling a request for secured connection from another network device (i.e., the second network device receiving a connection request from the first network device). The agent handling a request from a monitoring appliance is provided as an example embodiment.

The process is initiated in response to a connection request received from the monitoring appliance (Block 301). The requested connection can be any secured connection type including for example an SSH connection. The connection request includes identifying information or credentials of the monitoring appliance making the request. The agent then checks the credentials of the monitoring appliance against local information stored in the agent (Block 303). Checking the credentials can include determining whether a public key is available for the monitoring appliance and whether any certificate for the monitoring appliance is available.

If a key is found and other credentials are present for the monitoring appliance requesting the connection, but the credentials do not match those provided in the request, then the connection is refused and the process is ended (Block 305). If the credentials provided in the request match those locally held by the agent, then the connection is accepted and the normal operation of the secured channel is initiated (Block 307). The normal operation can include the reception and servicing of requests from the monitoring appliance for the information specified by the agent configuration data. After normal secured channel communication has been established, the connection request process is ended (Block 305).

If the credentials check fails due to a lack of credential information held by the agent, then the connection request is refused. However, a separate connection is initiated by the agent with the requesting monitoring appliance over a known port. A request is sent over the known port to obtain a certificate or similar information from the monitoring appliance (Block 309). The monitoring appliance should have initiated an agent listener to monitor the known port. The agent listener can be configured to accept HTTPS requests or similar communication requests. A check is made to determine whether the request to the monitoring appliance is successful (Block 311). A successful request will receive an acknowledgment response including a certificate (Block 313). An unsuccessful request will not receive a response and the request can either be tried again or the attempt can be aborted (Block 305).

Figure 4:
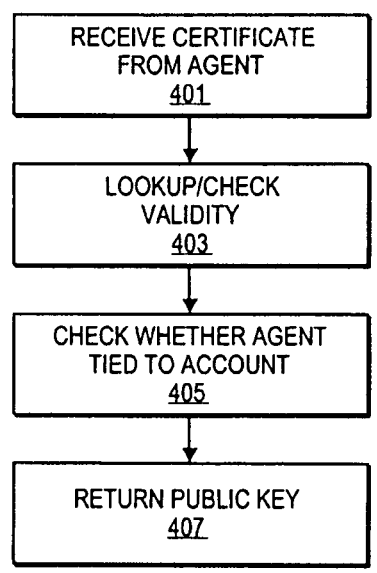
FIG. 4 is a flowchart of one embodiment of a process for backend server support for the agent-monitoring appliance configuration.

FIG. 4 is a flowchart of one embodiment of a process for facilitating agent and monitoring appliance configuration that is performed by the backend server. This process can be performed by a backend server assisting in establishing a secured connection between any two network devices (i.e., the first network device and the second network device) by assisting in the distribution of key pairs. The process is described in the context of assisting a monitoring appliance and agent for sake of clarity.

This process can be initiated by an agent sending a certificate or similar information identifying a monitoring appliance to the backend server (Block 401). The agent can use any communication protocol including secured or unsecured protocols for communicating with the backend server. The agent can supply a certificate identifying the monitoring appliance or other similar information to the backend server in response to a failed connection between the agent and the monitoring appliance. After the failed connection the agent retrieved the certificate or similar information from the monitoring appliance.

The backend server performs a look up or validity check operation on the received certificate (Block 403). This operation can be performed by any combination of the monitor key module and monitor certificate module or similar components of the backend server. A check operation is also performed to determine whether the agent performing the request is tied to the same account as the monitoring appliance identified in the certificate or similar information (Block 405). If the monitoring appliance and agent are not part of the same account, then the request will not be fulfilled. If the monitoring appliance and agent are part of the same account and a public key is found that is associated with the provided certificate, then the public key is returned to the requesting agent (Block 407). In another embodiment other credential information may be supplied to the requesting agent and other types of identifying information may be supplied by the agent to obtain a public key. Similarly, the agent can receive other types of credential or communication related data from the backend server to assist in authenticating the monitoring appliance when connections are to be established between the agent and the monitoring appliance.

Figure 5:
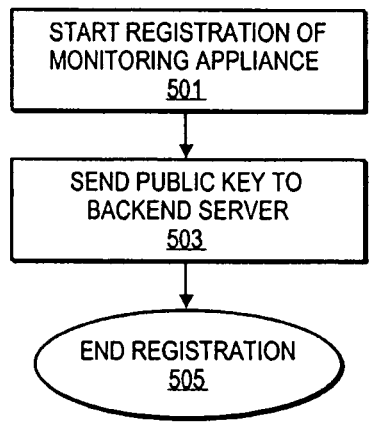
FIG. 5 is a flowchart of one embodiment of a process for monitoring appliance registration performed by the monitoring appliance.

FIG. 5 is a flowchart of one embodiment of a process for registering a monitoring appliance with a backend server that is performed by the monitoring appliance. This process can be utilized by any network device registering with a backend server (i.e., either the first network device or the second network device). The example embodiment of the monitoring appliance registering with the backend server is provided for sake of clarity.

The registration process is initiated by the monitoring appliance to provide the backend server with credential information for the monitoring appliance (Block 501). A communication connection is initiated by the monitoring appliance with the backend server, then the monitoring appliance sends a monitoring appliance key, public key or similar credential information to the backend server (Block 503). The monitoring appliance can wait for a confirmation or similar response before ending the registration process (Block 505). In another embodiment the monitoring appliance does not wait for a reply or acknowledgment of the registration request.

Figure 6:
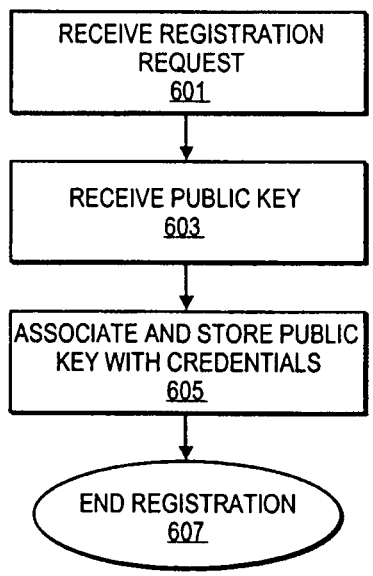
FIG. 6 is a flowchart of one embodiment of a process for monitoring appliance registration performed by the backend server.

FIG. 6 is a flowchart of one embodiment of a registration process performed by a backend server. This process can be utilized by a backend server to register any network device registering (i.e., either the first network device or the second network device). The example embodiment of the monitoring appliance being registered by the backend server is provided for sake of clarity.

The backend server receives a registration request from the monitoring appliance (Block 601). The monitoring appliance may initiate the registration using any protocol or communication medium that is understood by both the monitoring appliance and the backend server. After receiving and accepting the communication request the monitoring appliance key or public key is received from the monitoring appliance (Block 603). The received key is then associated with the credentials of the monitoring appliance and stored for future reference (Block 605).

In one embodiment, a check may also be made to determine whether the monitoring appliance is properly associated with an account and the credentials are valid. The registration request can also include a certificate for the monitoring appliance. In another embodiment, the certificate or similar identifying information is supplied in a separate process. After the monitoring appliance key or public key is stored and cross-referenced with the certificate, the registration process is ended by the backend server (Block 607).

Figure 7:
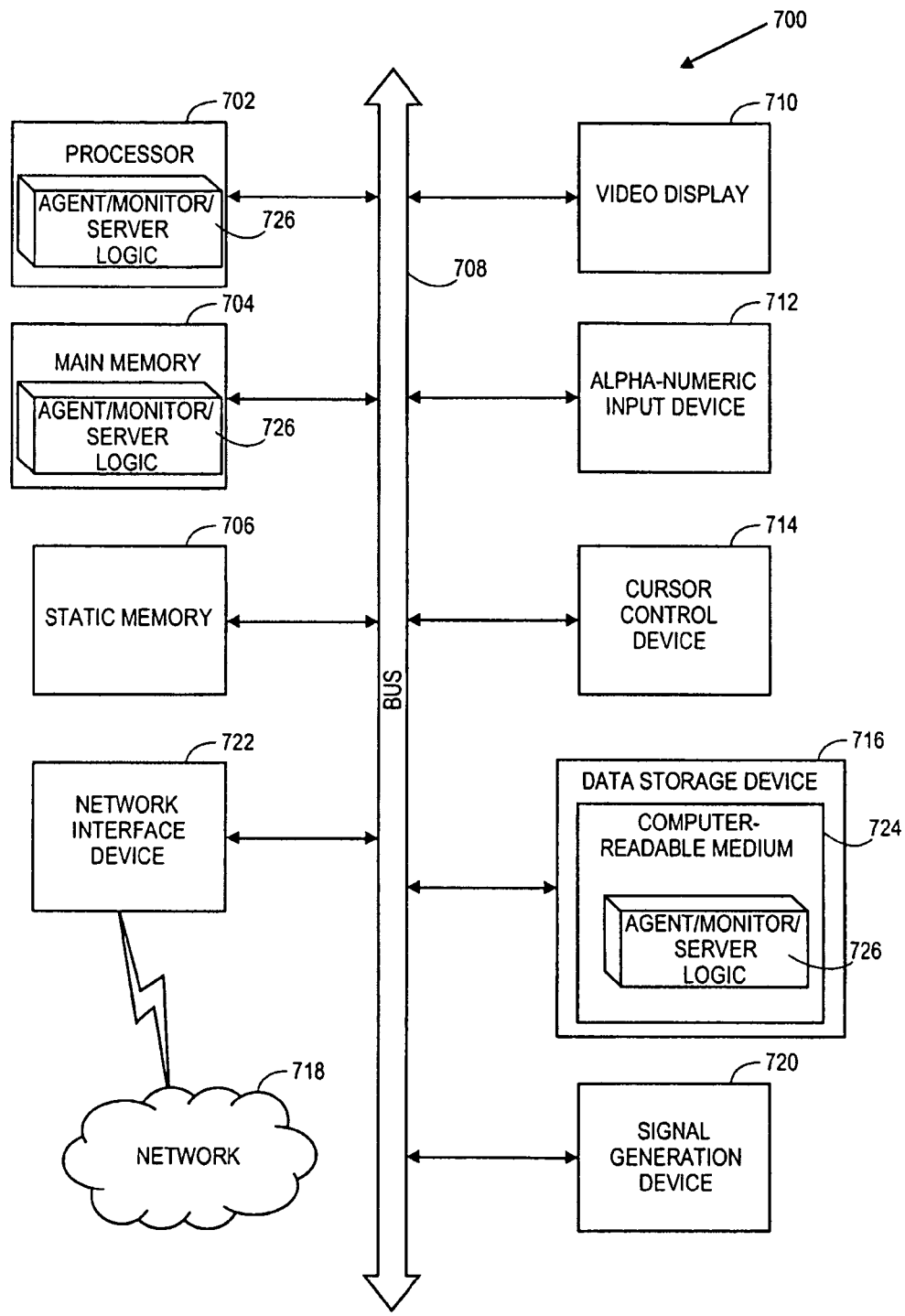
FIG. 7 is a diagram of one embodiment of a system for providing the agent/monitoring appliance/server logic.

FIG. 7 illustrates a diagrammatic representation of a machine in the exemplary form of a computer system 700 within which a set of instructions, for causing the machine to perform any one or more of the methodologies discussed herein, may be executed. The embodiment described herein relates to a computer system 700 that executes backend server logic, agent logic or monitoring appliance logic. However, one skilled in the art would understand that these are exemplary embodiments of the automated key distribution system which can be utilized by any two networked devices in coordination with a backend server or similar credential checking and key distribution device. In alternative embodiments, the machine may be connected (e.g., networked) to other machines in a (LAN), an intranet, an extranet, or the Internet. The machine operates in the capacity of a server or a client machine (e.g., the computer executing the agent or the backend server executing the data management interface) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable medium), which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 can also be one or more special-purpose processing devices such as an application specific integrated circuit (ASIC), a field programmable gate array (FPGA), a digital signal processor (DSP), network processor, or the like. The processor 702 is configured to execute the management station logic or agent logic 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., agent logic, monitoring appliance logic or backend server logic 726) embodying any one or more of the methodologies or functions described herein. The logic 726 may also reside, completely or at least partially, within the main memory 704 and/or within the processing device 702 during execution thereof by the computer system 700, the main memory 704 and the processing device 702 also constituting machine-readable storage media. The logic 726 may further be transmitted or received over a network 718 via the network interface device 722.

The machine-readable storage medium 724 may also be used to store the agent logic, monitoring appliance logic and server logic 726 persistently. While the machine-readable storage medium 724 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "searching," "receiving," "updating," "modifying," "assigning," "requesting," "clearing," "running," "committing," "moving," "executing," "closing," "detecting," "initiating," "returning," "checking," "connecting," "obtaining," "storing," "associating," "accepting," "initializing," "sending," "registering," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for managing the management and distribution of shared keys to establish secured connections between a set of network devices has been discussed herein. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving, by a first network device, a request from a second network device to establish a first secure connection with the second network device;
determining, by the first network device, that a data store coupled to the first network device does not store a public key of the second network device;
creating, by the first network device, a second secure connection with the second network device using a known port in response to determining that the data store does not store the public key of the second network device;
requesting, by the first network device, a certificate from the second network device using the second secure connection prior to an expiration of a predetermined timeout period;
in response to the request, receiving, by the first network device, the certificate from the second network device using the second secure connection;
receiving, by the first network device, a request to send the certificate of the second network device from a server system;
sending, by the first network device, the certificate of the second network device to the server system;
in response to the server system receiving the certificate of the second network device, receiving, by the first network device, the public key of the second network device from the server system;
establishing, by the first network device, the first secure connection with the second network device using the public key; and
closing the second secure connection with the second network device in response to establishing the first secure connection.

2. The method of claim 1, further comprising:
refusing the request to establish the first secure connection in response to failing to verify the certificate of the second network device with the public key of the second network device.

3. The method of claim 1, further comprising:
storing the public key; and
associating the public key with the certificate of the second network device.

4. The method of claim 1, further comprising:
accepting a subsequent request to establish another secure connection with the second network device using the public key of the second network device.

5. A non-transitory computer readable storage medium comprising instructions that when executed, cause a processing device on a first network device to perform operations comprising:
receiving, by the processing device on the first network device, a request from a second network device to establish a first secure connection with the second network device;

determining, by the processing device, that a data store coupled to the first network device does not store a public key of the second network device;

creating, by the processing device, a second secure connection with the first network device using a known port in response to determining that the data store does not store the public key of the second network device;

requesting, by the processing device, a certificate from the second network device using the second secure connection prior to an expiration of a predetermined timeout period;

in response to the request, receiving, by the processing device, the certificate from the second network device using the second secure connection;

receiving, by the processing device, a request to send the certificate of the second network device from a server system;

sending, by the processing device, the certificate of the second network device to the server system;

in response to the server system receiving the certificate of the second network device, receiving, by the processing device, the public key of the second network device from the server system;

establishing, by the processing device, the first secure connection with the second network device using the public key; and closing the second secure connection with the second network device in response to establishing the first secure connection.

6. The non-transitory computer readable storage medium of claim 5, wherein the operations further comprise:
refusing the request to establish the first secure connection in response to failing to verify the certificate of the network device with the public key of the network device.

7. The non-transitory computer readable storage medium of claim 5, wherein the operations further comprise:
storing the public key; and
associating the public key with the certificate of the network device.

* * * * *